United States Patent
Wild et al.

[11] 3,731,225
[45] May 1, 1973

[54] FIBER OPTIC LASER SYSTEM

[75] Inventors: Norman R. Wild, Nashua, N.H.; Paul M. Leavy, Jr., Lynnfield, Mass.

[73] Assignee: Sanders Associates, Inc., Nashua, N.H.

[22] Filed: Apr. 2, 1962

[21] Appl. No.: 184,602

[52] U.S. Cl. ............ 331/94.5 P, 331/94.50, 350/96 B
[51] Int. Cl. ............ H01s 3/00, H01s 3/04, H01s 3/09
[58] Field of Search ............... 331/94.5 P, 94.5 O; 350/96 B

[56] References Cited

UNITED STATES PATENTS 2,806,969  9/1957  Williams et al. .................. 313/92.5

OTHER PUBLICATIONS

Snitzer, E. "Proposed Fiber Cavities for Optical Masers" In Journal of Applied Physics, ed. J. H. Crawford, Vol. 32, No. 1, Jan. 1961, pp. 36–39.

*Primary Examiner*—Verlin R. Pendegrass
*Attorney*—Louis Etlinger

EXEMPLARY CLAIM

1. A fiber optic lasing system comprising an active fiber optic element,
   said active fiber optic element having a core and a cladding around said core,
   said core having therein an active material which will produce stimulated emission when an excitation source pumps energy into said active material,
   an excitation source,
   said excitation source located at one end of said active fiber element to pump energy into said active fiber optic element to produce a stimulated emission of said active material
   said excitation source being in physical contact with said end of said fiber optic element.

14 Claims, 21 Drawing Figures

Norman R. Wild
Paul M. Leavy, Jr.
INVENTORS

Norman R. Wild
Paul M. Leavy, Jr.
INVENTORS

Norman R. Wild
Paul M. Leavy, Jr.
*INVENTORS*

FIBER OPTIC LASER SYSTEM

This invention relates to a high power pulsed maser which utilizes a unique phosphor light pump and an active element maser of limited mode glass fibers in a traveling wave geometry.

More specifically, this invention relates to the use of phosphors as maser pumps wherein the active element to be pumped are small diameter maser glass fibers. These small glass fibers supporting only a few low loss modes and accordingly, provide a matrix of elements which will allow a lifetime for pumping which in turn approaches the natural spontaneous lifetime of the active maser material.

This invention further relates to the use of phosphors whose brilliance are near that of a carbon are as a light pumping source.

The present state of the optical maser art relies on the pumping of a crystalline materials such as a ruby or a calcium tungstate crystal with a flash lamp, stontium titanate, calcium fluoride, and others. The crystal involved usually takes the shape of a cylinder with its ends coated with highly reflective materials to form a Fabry-Perot resonator. A xenon flash tube is adjacent to crystal. When the flash tube is fired, it pumps light into the crystal through the crystals' sides. The flash lamps conversion efficiency to light seldom rising above 25 percent and even with narrow band light sources, less than 20 percent of the light output lies in the absorption band of the crystal; of this last-mentioned energy, only a fraction is coupled into the crystal. As a result of these losses about 1 percent of the energy is now usefully coupled into the crystal.

The fact that the crystal is formed as a Fabry-Perot type resonator means that the crystal will inherently support a large number of oscillatory modes, only a few of which will be tuned to go-bands. As a corollary to this, much of the energy existing in the stop bands will be converted into spontaneous emission and stray emission. It has been estimated that as much as 30 percent of the energy is given off in stray emission and other 30 percent of the energy is given off in spontaneous emission. There are additional losses as high as 10 percent due to the $I^2R$ losses in the crystals' reflective ends. The presence of all the above noted inefficiencies results in the generation of heat which is difficult to dissipate, as it appears in such large quantities.

Cryogenically cooled optical masers are still faced with the heat problem which places an upper limit on the pumping energy which may be employed and hence, the useful output which may be obtained.

Many of these deficiencies outlined above have been avoided or reduced to a minimum as a result of the invention described hereafter.

Basically, this is accomplished by the fabrication of an optical maser, herein after referred to as a laser, from a non-crystaline material such as a silicate based glass doped with a rare earth such as neodymium or praesodymium. An alternative approach would utilize very small crystals of tetra doped laser crystals in a calcium fluoride crystaline structure, which very small crystals would be reduced in size and combined with a suitable material of proper index of refraction.

The resulting mixture would then be formed into small clad fibers and in turn the fibers would be fabricated into small bundles.

Fabrication of these bundles into a structure with space left between the bundles to facilitate a coolant circulation results in the efficient cooling of the bundles.

A light pumping source will be required for the above bundle arrangement. One approach to provide the needed light source would be to coat the input end of the fiber bundles with a high intensity phosphor having spectral emission lines which lie wholly within the absorption band of the laser material. These phosphors would be backed by a highly reflective metallic coating and in turn excited with a high voltage electron beam. Hence, when the phosphors are excited, light energy would be efficiently captured by the fiber bundles comprising the laser and would be utilized as pump light. Once pump light was introduced into the fiber bundles, it would not escape and could be almost 100 percent utilized to stimulate coherent emission. The pumping efficiency is governed by the quantum efficiency of the absorption band at the pumping wavelength chosen.

It should be noted that the individual fibers which are formed into bundles are clad with a material which will allow a small percentage of energy in the fiber to cross-talk or cross couple with adjacent fibers, thereby enhancing phase coherence between adjacent masing fibers. A suitable cladding material would be composed of a glass which is the same as the host glass for the active maser material, of course, the active material would be removed.

The electron beam exciting the phosphors could be focused down to a narrow spot and swept across the face of the phosphors to successively excite all of the fibers. The area of phosphor excited by the electron stream illuminating the fibers long enough to pump its atoms up to its energy level for lasing.

An alternative phosphor pump and laser bundle arrangement is also available wherein a small space would be left between the ends of the fiber bundles and a phosphor face plate. This space would permit the passage of a liquid coolant for the phosphors.

It is therefore an object of this invention to utilize small glass fiber as active maser elements in which only a few modes may be supported.

Another object of this invention is to bundle small glass fibers together to form an active maser unit in which there is cross coupling between fibers, thereby enhancing the coherent emission of the bundle.

As another object of this invention, the ease in manufacturing fibers of small diameters in large volume effects significant savings in manufacturing cost.

Yet another object of this invention resides in the utilization of the glass fibers high surface to volume ratio to provide for optimum heat transfer configurations.

Another object of this invention lies in the use of one or more elements in a suitable binder which element or elements have the inherent capacity to produce a stimulated emission.

Another object of this invention is the incorporation of masing ions in a suitable host media and fabrication of these micro-elements into an environment of suitable index or refraction formed into active maser fibers and then fabricated into fiber elements.

Another object of this invention is the provision of a phosphor light pump having a complete high speed control of pumping rate.

Another inventive object of phosphor pumping is the capability of matching the phosphors fluorescent spectral output with maser absorption bands of the active maser material to optimize energy coupling.

Another object of this invention is providing a phosphor light pump resides in the highly favorable location of the pump with respect to the ends of maser fiber bundles and the advantage of maser fiber bundles which may be phosphor light pumped from the sides as well or in place at end of pumping.

Another object of this invention rests in the ease with which the phosphor pump assemblies may be automatically manufactured.

Another object of this invention is the high efficiency of the phosphor pumps output in the desired absorption bands relative to electrical input to the pump.

For a better understanding of the present invention, reference is made to the following description with the accompanying drawings, and its scope will be pointed out in the appended claims.

Figure 1:
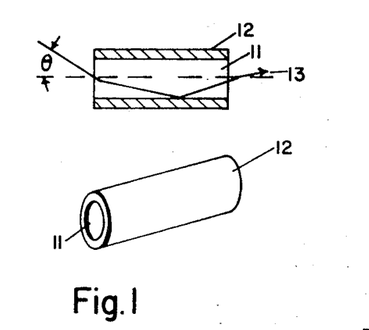
FIG. 1 is a single active optical fiber shown in section and in perspective.

Referring now to FIG. 1 which depicts a single optic fiber 11 clad with a suitable refractive material 12, the fiber material 11 comprises the active lasing element. It is this fiber and its respective cladding which form the basic building block upon which the system, to be described in full hereafter, depends. The shape of the fiber and its dimensions are important.

The fiber 11 and its cladding respond to the presence of a light source in a predictable manner. This is to say, the optical fiber has a numerical aperture which determines its most efficient light gathering capacity. This numerical aperture might best be thought of with respect to an individual ray of light 13 striking the end of the fiber 11. There exists a maximum cone angle $\theta$ or angle of capture, which cone angle determines the maximum incident ray angle which will permit a ray of light 13 to be totally reflected from the sides of the fiber. The numerical aperture for purposes of this description equals sin $\theta$ and related maximum cone angle are dependent on the refractive indexes of the cladding 12 and the optical fiber 11. The following formula controls:

$$\text{Numerical aperture} = (n_1^2 - n_2^2)$$

where: $n_1$ = refractive index of fiber
$n_2$ = refractive index of the cladding A determination of the maximum cone angle is significant when the situation of spacing the light source from the end of the fiber is involved. This spacing situation is to be described more fully hereafter with regard to the embodiments of FIGS. 3, 4 and 5.

Basically, laser operation requires an active material that will produce stimulated emission of radiation, when an excitation source pumps power into the active material. This stimulated emission phenomenon has been explained in detail by one Sy Vogel in a publication entitled "Lasers", found in the *Electronics* magazine, Oct. 27, 1961, pgs. 40–47. Reference is accordingly made to the above article and a detailed explanation will not be made herein.

Of special interest as an active lasing material has been neodymium in various crystals. The capacity of this element to lase in a glass environment has raised a special interest because the glass may be drawn upon heating into long precise fibers. These fibers would take the form of the fiber 11 depicted in FIG. 1. It is to be understood of course that there is no limitation on what active element is used as long as the element may be formed into fibers and suitably clad.

Figure 2:
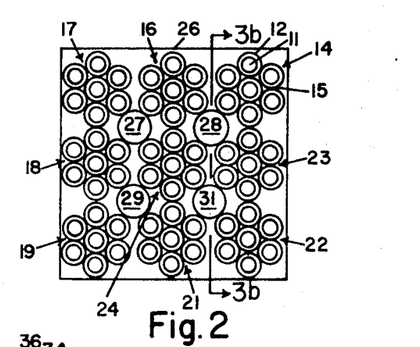
FIG. 2 depicts a number of active optical fibers in bundle form.

Referring now to FIG. 2 wherein there is depicted a plurality of optical fibers 11 with their respective claddings 12 bonded together to form a unit bundle 14. The respective fibers 11 and their claddings 12 are fused one to another. In this fused form they make up composite bundles 14, 16 and 17, forming an upper row in a housing 26. A second row of bundles 18, 24, 23 are schematically depicted, as are a third row of bundles 19, 21 and 22. Inserted between the bundles, for example, 16 and 17 are thermostatically cooled, heat bars schematically shown located between bundles 16, 17, 18 and 24. It should be noted that if the heat bars 27, 28, 29 or 31 were removed, the space remaining could be utilized to conduct a cooling fluid in and around the respective bundles. The operation of these groups of active fiber bundles will be described more fully hereafter.

Figure 3A:
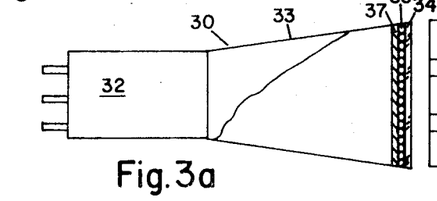
FIG. 3a is a partial section of a phosphor pump.
Figure 3B:
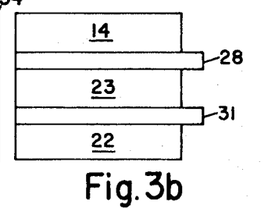
FIG. 3b is a section taken along the lines 3b—3b in FIG. 2.
Figures 4, 5:
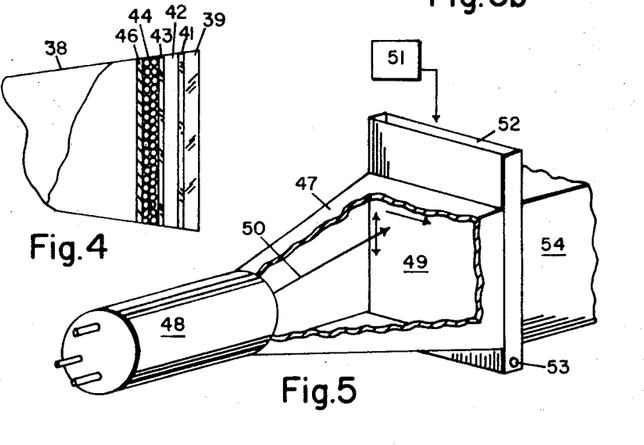
FIG. 4 is a partial section of another embodiment of a phosphor light pump.
FIG. 5 depicts an entire system including a light source, an active lasing matrix and related cooling apparatus.

Referring now to FIGS. 3a, 4, and 3b, wherein there is depicted the basic components needed in a lasing system, FIG. 3a illustrates one type of phosphor light pump employed which takes the general form of the end surface of a cathode ray tube 33 with a power source 32. The face surface of this tube is comprised of basically three layers, the glass front 34, a phosphor coating 36 and a reflective metallic coating 37 backing up the phosphor. The source of exciting energy comes from a cathode in the rear of a tube 33. In order that the phosphor pump emit light, the illumination of the phosphor with a high intensity electron beam is utilized. The above-noted layers of glass 34, phosphor 36 and metal 37 must have certain properties.

Starting with the metallic, reflective surface 37, this metallic surface must be highly electrically conductive. Of prime importance is the fact that when high voltage electrons are directed from the cathode to the metallic surface, the metallic surface be relatively transparent at these high voltage levels.

The inside surface, i.e., the surface of the metal coat 37 next to the phosphor 36 must be relatively smooth. As a corollary to the smoothness of the metallic surface, the metal 37 must have a high reflectivity in the wave band of particular interest. Of almost equal significance is the fact that the metal must be chemically inert with respect to the phosphor and any materials which may have been used with the phosphor in the process of making the phosphor coat upon which the metallic surface comes in intimate contact.

Typically, materials which possess a high reflective surface and would be suitable in a variety of applications are as follows: gold, aluminum, silver, copper or even rhodium.

The next layer to be considered is that of the phosphor 36. Here the phosphor should be of a very small grain size. The thickness should be equal to the mean electron penetration in the coated phosphor plus a small additional thickness to utilize the higher energy electrons. It should be noted that the grains of phosphor may have void spaces between them or the void spaces may be completely filled in by an inert median having a refractive index, suitably related to the index of the phosphor. Therefore if the phosphor has an index of refraction which is designated $n_1$ and the substrate upon which the phosphor is deposited has an index of refraction $n_2$ the inert medium which is designated $n_3$ preferably should have an index of refraction which is the route mean square of $n_1$ and $n_2$. A typical inert medium is barium silicate. The void space may be filled by an active median of identical or similar composition as the phosphor and may even be substituted for the phosphor grains so that simple or multiple layers of homogeneous active phosphors film or films may be used as well as simple phosphor grains.

The basic law controlling the thickness of the coat of phosphors requires that the thickness of the coat be governed by an exponent of the electron voltage. The controlling equation is $$x = \text{constant } E^y$$

where $x$ = depth of penetration.
$E$ is the primary electron energy.
$y$ = logarithmic functions of $E$.

The penetration of the phosphor bearing a direct relationship to the exciting electron voltage. It is worthwhile to note that for each phosphor there is an optimum thickness at which the phosphor will fluoresce. The thickness of the phosphor used will differ with different combinations of electron voltage intensity and the phosphor employed.

The cathedoluminescence of phosphors has previously been limited to efficiencies of the order of 0.7 to 1.0 percent conversion of electrical energy to radiant output in the emission band of the phosphor. Brilliance has not been high by comparison to xenon flash tubes (output $\approx 50$ joules cm$^{-2}$ per flash) or to steady state sources. Recently, F. Williams has obtained a U.S. Pat. No. 2,806,969, upon a means of excitation of high intensity phosphors to a brilliance approaching the carbon arc and output-input efficiency of converting electron beam power to light of the order of 20 percent.

On a steady basis, this is of the order of 3,000 watts cm$^{-1}$ with certain cycle duly limitations, which over a reasonable period, will exceed the radiated light output of a high power flash tube due to the thermal problems associated with the flash lamp rapid cycling for a prolonged period.

The light emission from the phosphor is confined to a portion of the visible spectrum and, by suitable selection of active phosphor materials, it can be arranged so that the spectral distribution of intensity vs. wavelength is a reasonable match of the curve of absorption vs. wavelength for the active material of the fiber bundles. In maser glass, the primary absorption is at 5800A which loads considerable energy into the glass on photon conversion to 10,650A emission. The quantum efficiency is close to 100 percent for this line. The lower line in the $0.8\mu$ to $0.9\mu$ region (8800A) is less effective in pumping but releases less heat on a wavelength conversion basis so that there can be a maximizing of optical maser output for a minimal energy input by selectively pumping at different wavelengths. Accordingly, the problem of heat release is eased by the use of a phosphor pump at proper characteristics.

In gas discharge production of light, the electron stream between electrodes reaches thermal equilibrium with the valence electrons of the ions present. The intensity is therefore equal to the equivalent intensity in the same spectral region as a black body at the electron stream temperature equivalent. A continuum necessarily arises as pressures rise, collisions between radiating atoms occur, higher states of ionization are induced and so on, so that maximum light output from a gas discharge lamp causes a lot of unwanted radiant energy to be released. The removal of this energy in the form of heat and protection of sensitive materials from the harmful effects of high power (high quantity of highly energetic photons) U.V. and soft Xray as well as heat poses a serious problem for those who rely on a gas discharge device to supply light.

This phosphor coat 36 is applied directly to he surface of the glass 34. There are several techniques available for securing this surface. A notable one is the well-known settling technique in which a mixture of phosphors are suspended in a fluid. This fluid basically is comprised of water or other suitable solvent with a small amount of an alkali silicate which will act as a binder as the phosphor particles settle on the surface of the glass desired to be coated. Also available is the well-known technique called electrophoresis which also will provide a suitable phosphor coat.

The high index of the phosphor materials, i.e., ≈2.4 makes them very effective scatters even though they are transparent to their own output. While it is necessary to insure that all the surface of the glass is coated with phosphor granules, for maximum output, this implies more than one layer of grains thereby decreasing output. The use of very fine phosphors of $1-2\mu$ size will allow dense coatings of the order of $4-5\mu$ average thickness which will produce maximum brilliance around 20KV excitation, for example.

Of prime importance is the fact that the phosphor mixture incorporated in the light pump source fluoresce upon cathodic bombardment. The selection of the phosphorous to be used in the coating is determined by the ultimate end use of the light source produced and by its special endurance characteristic under cathode ray bombardment, i.e., its luminesce efficiency as a function of temperature must remain high and its resistance to the formation of electron trapping sites (color enters).

The yellow component of the P4 or P23 phosphor (Zn,Cd): Ag, has the required spectral peak and approximately the band width to match the primary absorption line of master glass. Available to the user of this type of light source are a multiple of different phosphors, many of which have different cathedoluminescence spectrum. The very presence of the particular spectra may be utilized to great advantage in activating an optical maser. This is because the cathedoluminescence spectrum of the phosphor can be picked to match the absorption spectrum of the active maser material. The laser involved will then have an absorption line which bears a direct relation to the phosphor utilized and the spectra at which it operates.

It is worthwhile to note that while to this point an electron beam of high intensity has been referred to as the means for causing the phosphor to fluoresce, one might also utilize a suitable source of electron energy which is pulsed to luminate the entire phosphor face of the tube.

Referring now to FIG. 3b where there is shown a section taken along the line 3b—3b in FIG. 2. An active fiber bundle 14 is located perpendicular to the face 34 of the phosphor light pump 30. In a like manner, bundles 23 and 22 are also similarly located. The cooled bars 28 and 31 are extended from the rear of the active fiber bundles 14, 23 and 22. These bars serve as an efficient means for removing excess heat generated during the process of stimulated emission in the fiber bundles 14, 23 and 22, this stimulated emission occuring when the phosphor light pump 30 with its phosphor coated glass 36, 34 fluoresce upon cathodic electron bombardment from the power source 32. The metallic backing 37 reflects this light into the ends of the active fiber bundles 14, 23 and 22. The energy from the light so reflected bring about a stimulated emission of coherent energy which is translated through the active fibers in a traveling waveguide manner. A side product of the stimulated emission is heat, which the heat bars 28 and 33 assist in removing. A detailed description of the stimulated emission and its relationship to the phosphor pump will be made in a discussion of FIG. 10.

FIG. 4 schematically shows a phosphor light pump which combines the cathedoluminescent phenomenon with an electroluminescent amplifier to produce an extremely bright output in a preselected spectral emission line.

The cathedo-electroluminescent light pump is comprised of a glass face 39 which has on the inside surface a transparent electrically conductive coat 41 of a transition metal oxide such as nickel oxide, titanium dioxide or vanadium oxide. It is important that the transparent layer be a half wavelength thick at the operating wavelength desired. Backing this transparent electrically conductive layer 41 is a thin layer of electroluminescent phosphor. This phosphor may be of a common material such as ZnS: Mn with a coactivator chlorine. This material exhibits strong electroluminescence at $1-2 \times 10^5$ volt cm.$^{-1}$ The electroluminescent phosphor 42 has a backup layer 43 of transparent electrically conductive material also made up of a transition metal oxide as was layer 41, the backup layer is controlled by the same parameter as the layer 41.

This electroluminescent arrangement fundamentally is capable of high level output at extremely high efficiency, somewhat over 100 percent light output compared to the electrical power input, ideally suits laser pumping requirements.

The cathedo-luminescent phosphor coat 44 has the same properties as the phosphor coat 36 in FIG. 3a. The reflective metallic layer 46 also has the same properties as the metallic backing 37 in FIG. 3a. In operation, a high intensity electron beam passes through the thin metallic coat 46 and causes the phosphor in layer 44 to fluoresce. The light produced, aided by reflection from metallic layer 46 passes into the electroluminescent layer 42 which maintained at 100,000 to 200,000 volt potential between transparent electrically conductive layers 43 and 41. In this layer the light that enters undergoes considerable amplification via a phenomenon not completely understood. This amplified light then passes through the glass face 39 and may in turn be used to bring about a stimulated emission in an active laser fiber system of the type depicted in FIG. 5. The system requires variation in the voltage across the electroluminescent film as well as motion of the beam if a form of continuous output is desired. Pulsed operation is also possible.

Referring now to FIG. 5 which depicts an entire system including a light source in the form of a cathode ray tube 47 and its electron beam power source 48. A phosphor light pump 49 is actuated by an electron beam 50 which produced a spectral band of light suitable for producing a stimulated emission in the active fiber laser bundle unit 54. The presence of a coolant fluid from coolant supply 51 entering coolant passage chamber 52 facilitates in maintaining the phosphor light pump 49 at a desired operating temperature. Removal of coolant is provided for by coolant return port 53. The selection of a suitable coolant has a basic requirement that the coolant be transparent at the light wavelength produced by the phosphor light pump 49.

Figure 6:
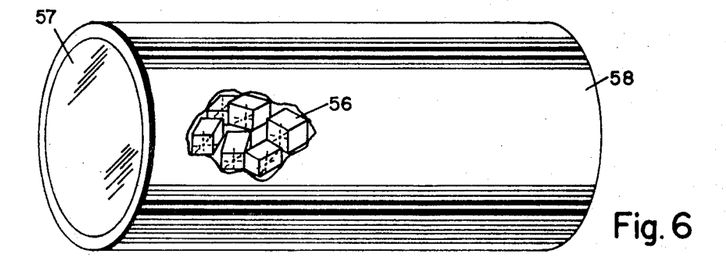
FIG. 6 depicts in partial section and active optic fiber element incorporating a schematic showing of trivalent uranium in a crystaline structure.
Figure 7:
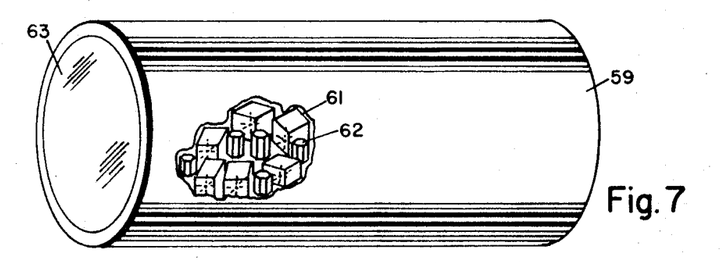
FIG. 7 depicts in partial section an active optic fiber element in a schematic showing of trivalent uranium in a crystaline structure plus neodymium.

Referring now to FIG. 6 and FIG. 7, there are schematic perspective views of other active laser element embodiments.

The high brilliance of tiny grains of phosphors ideally suits many of them for use as maser materials. There are also a host of other active elements which if supported in a crystaline host structure exhibit strong lasing properties under properly stimulated conditions. Some of those in existence are as follows: trivalent uranium in calcium fluoride, trivalent holmium in calcium tungstate, divalent Samarium in calcium fluoride. This list continues to grow and the use of these elements in the invention to be described hereafter contemplates the use of new maser materials in matrix fiber arrangements described hereafter, and contemplates the use of new maser materials in matrix fiber arrangements described, and those yet to be described.

A basic problem encountered in attempts to use the above-noted materials resides in the difficult task of growing them into large laser quality sizes. Pursuant to this invention, the small grain 56 now available would be placed in a suitable high index material 57 and then in a thin tube 58 and would become effective, crystal fibers for optical maser use.

Another approach is to go to multiple ion doping of maser materials such as sapphire and spinel, for example. The important advance here lies in the fact that the absorption lines of a non-maser dopant would lie outside the absorption lines of the laser material but the emission bands of the extra ions would be within the primary or secondary absorption bands of the active maser material.

In maser glasses, empirical evidence is that maser materials having a terminal state within 500cm$^{-1}$ of the ground state do not perform as optical maser materials in glass. Multiple ion doping of tiny, perfect, rare-earth crystals of calcium tungstate or the mixing of singly-doped microcrystals of different doping advances the state of the art.

Accordingly, it is asceted that the strongly mode limited characteristics of small fibers is not limited to glass doped with neodymium. The traveling wave maser of the subject invention can be made to work equally well with microcrystals immersed in a matching index of refraction environment and confined within a small bore tube of different index of refraction.

The tube need not be of a lower index of refraction; in fact, the tube can be of a higher index of refraction than the core and still operate properly, providing that a lower index of refraction cladding exists on the inside of the tube between the low index core and the high index cladding.

Referring to FIG. 7, there is depicted another schematic embodiment of an active laser fiber. The fiber is comprised of a thin tube 59 in which are dispersed different active lasing crystals 61, 62 in a suitable binder material 63. If the active crystals are selected so that their absorption bands are in reasonably close proximity and their spectral emission lines are different, as is the case when trivalent chromium and neodymium, then a frequency diversity output is achieved. At the same time it is seen that one phosphor light source with one selected spectral light band phosphor will produce a diverse frequency output.

On the other hand, an alternative approach would utilize combinations of different-colored phosphors in the light pump to excite different combinations of laser materials, still undiscovered. It is important to note that while a phosphor light pump has been specifically associated with the active fiber elements, other light sources might be used.

The building materials 57 and 63, FIG. 6 and FIG. 7, as basic requirement, should have an index of refraction that closely proximates that of the crystal.

Figure 8:
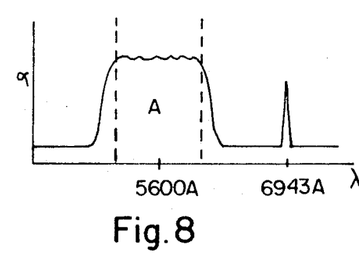
FIG. 8 is a graph plotting the spectral absorption curve for neodymium.
Figure 9:
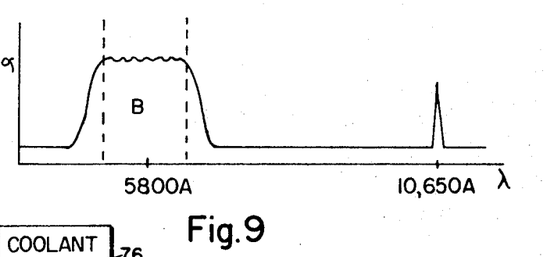
FIG. 9 is a graph plotting the spectral absorption curve for trivalent uranium.

Referring now to FIG. 8 and FIG. 9 which graphically display typical absorption and emission curves for neodymium doped glass and trivalent chromium in a sapphire host crystal.

From the study of these two curves, it is seen that the absorption bands A and B are in reasonably close proximity. It is also evident that neodymium lases at a lower frequency than the trivalent chromium.

It is these very characteristics that ideally suit the construction of a laser in which there would be frequency diversity capabilities with the committment saving in a light pump due to the fact that the absorption bands of the two components are so close that a light source need only produce light in this absorption band.

Figure 10:
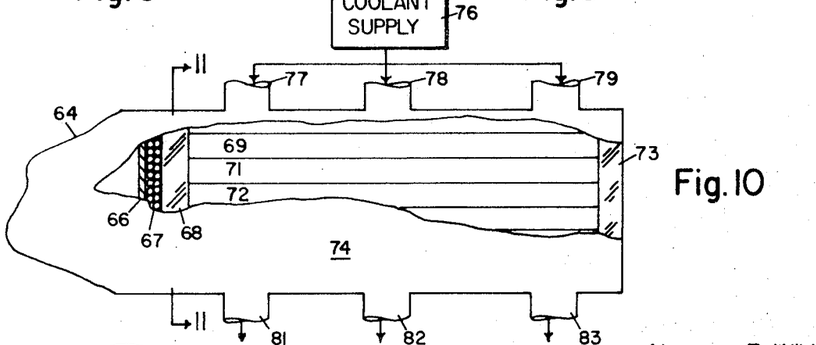
FIG. 10 depicts another system embodiment including a light source, an active lasing matrix and relating cooling apparatus.

Referring now to FIG. 10 in which there is another embodiment of the entire system, the general arrangement taking the form as will follow:

A cathode ray tube 64 has at one end a power source not shown, at the right hand end is a phosphor pump of the type described in FIG. 3a with a metallic reflective layer 66 and phosphor coat 67 in intimate contact.

Alongside the phosphor pump arrangement is an active laser bundle arrangement with active laser bundles 69, 71 and 72 disposed in parallel relationship. The left hand end of the active laser bundles 69, 71, 72 are fused together by their claddings to form a composite area 68 of fused material and active fiber bundles, as best seen in the section depicted in FIG. 11.

Figure 11:
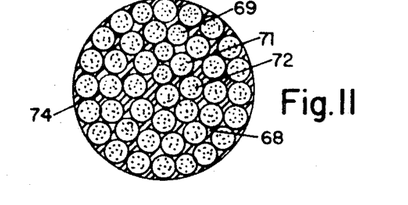
FIG. 11 is a section taken along line 11—11 in FIG. 10.

Once the bundles, for example, 69, 71 and 72 have been fused together, the end surface 70 would be ground smooth and the phosphor coat 67 applied. The right hand end of the active fiber bundles 69, 71 and 72 would have a similar fused cladding portion 73. The entire bundle arrangement and fused end portion 68, 73 is enclosed in a housing 74. While the drawings of FIG. 10 and FIG. 11 depict a schematic showing, it is intended that there be small spaces between the fiber bundles (not shown) to permit the flow of fluid through the bundle arrangement.

Cooling the system is accomplished by pumping a coolant from a supply 76 to coolant entry ports 77, 78, 79, the coolant pumping rate and the number of entry ports depending on the heat generated in the system. The coolant would flow through and around the bundle arrangement and exit through coolant return ports 81, 82 and 83.

With the phosphor light pump source directly on the ends of the active fiber elements the capacity of the core elements to capture light is greatly enhanced. The light from the activated phosphor coat 67 which enters the higher index of refraction cores of the active fiber elements, enters at an angle near the critical angle, or beyond will be captured and cannot leave the core (save by scattering) so that the active core's absorption is very high.

The power output of this type of arrangement is controlled by many factors. Some basic considerations are described hereafter.

Lifetime of the state due to spontaneous emission of radiation by a transition between two energy levels is given by the following expression.

$\tau = 3\ hc^3\ (64\ \pi^4\ \gamma^3\ \mu^2)$ where $\mu$=the matrix element involved in transition.

$\gamma$ = half width of the atomic resonance at half-maximum intensity.

$c$ = velocity of light.

$h$ = Planck's constant.

The number of modes permitted for example in a 1 to 2 $\mu$ core is small, i.e., of the order of 10 or less; accordingly, the maintenance of a useful, long lifetime for pumping will be present.

In a situation, for example, where the active fiber bundles are pumped for $10^{-4}$ seconds, with one of the light pumps described, at 50 watts $cm^{-2}$ and the optical coupling intensity gain is 3, then about $2 \times 10^{-2}$ joules $cm^{-2}$ of phosphor area are available for pumping.

For a bundle of fibers 100 $\mu$ in diameter,

The volume is $v = \Pi \times 2.5 \times 10^{-5}$ $cm^3$/cm length.

The surface area is $s = \Pi \times 10^{-2}$ $cm^2$/cm length.

For 1 $cm^3$ of such fibers, the length of $1.6 \times 10^4$ meters, and the area is $5 \times 10^4$ $cm^2$ so that some $10^3$ joules per cubic centimeter of fiber bundles would be delivered by the pump in $10^{-4}$ seconds. Since the percentage of the bundle volume occupied by the cores is almost 50 percent and the loss of pumping light on multiple scattering is finite (about 90% reflection per scattering bounce) not more than $10^3$ joules $cm^{-3}$ of maser glass would be the upper limit but more than $10^2$ joules $cm^{-3}$ is certain. Accordingly, 10–100 $cm^3$ of active laser material would release about $10^3$–$10^4$ joules.

The time control of release may be attained by suitable longitudinal subdivision and interposition of high speed optical gates to allow a signal introduced at one end of a fiber to be propagated through the whole length ahead of spontaneous depletion of excited levels.

The above-noted 10–100 $cm^3$ of active material represents a normal doping level of high quality laser glass. As the state of the art develops and new active laser material is developed, these figures will move upwards and this invention anticipates the incorporation of such new material.

Referring again to FIG. 10, the phosphor coating on a cathode ray tube 64 used to pump, for example, 100 $\mu$ fiber bundles requires about 40 milliwatts $cm^{-2}$ at 20KV for electron bombardment excitation. The fact that the surfaces of thermionic cathodes can withstand current densities of the order of 1–2 amps $cm^{-2}$ leads to a discussion of other embodiments in which one cathode can supply electrons for many coated tubes. Field emission effect cathodes, can release up to 12,000 amperes $cm^{-2}$, each point emitting into a cone at approximately 60°. Either form of electron source may be used in the device.

Figure 12:
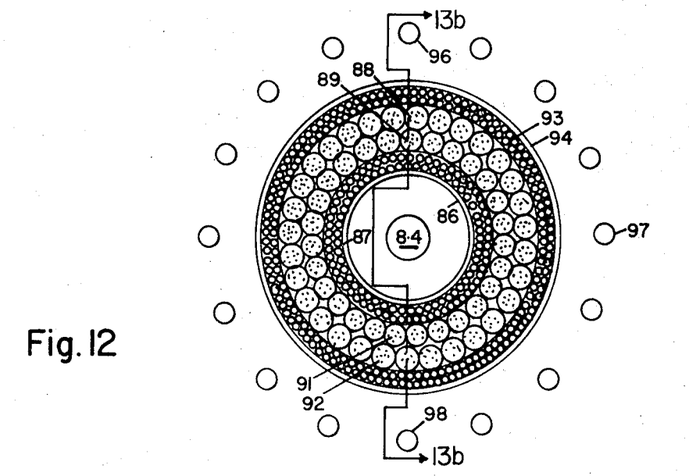
FIG. 12 depicts another embodiment of the active fiber bundles in an arrangement which will allow side light pumping.

Referring now to FIG. 12 which schematically illustrates an embodiment of the invention featuring side phosphor light pumping. In the very center of the arrangement is a cathode 84, radially disposed from the cathode 84 is a thin, metallic, reflective layer 86. Active laser bundles such as 88, 89, 91 and 92 are circumferentially disposed in a tightly-packed matrix about central cathode 84.

A second phosphor light pump surrounds the last-mentioned matrix of active laser bundles, and is comprised of a phosphor grain coat 93 which in turn is backed up by a thin, reflective metallic layer. Cathodes such as 96, 97 and 98 are radially disposed at equal distances in a circumferential pattern. The operation of this arrangement will be discussed hereafter.

Figure 13A:
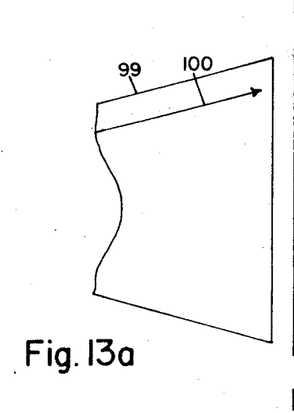
FIG. 13a depicts schematically a light source.
Figure 13B:
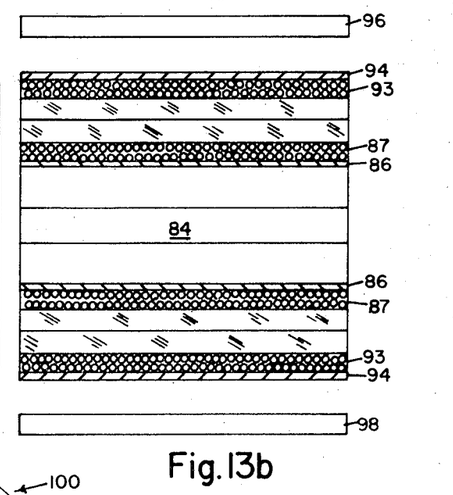
FIG. 13b is a section taken along lines 13b—13b in FIG. 12.

Referring now to FIG. 13a and FIG. 13b which collectively illustrate schematically an entire system.

FIG. 13a schematically represents a cathode electron beam light source 99. It should be noted that while an electron beam light source has been schematically depicted, other light sources of desired band width might readily be substituted therefor. In operation, the system works as follows: the central cathode 84, if operated on a steady basis, will constantly emit an electron beam field which will penetrate the reflective, metallic layer 86 and upon entering the phosphor grain coat 87, fluoresce, and the light produced thereby will enter the active laser bundles 89 and 88 to assist in raising the energy level of the active lasing material situated in the bundles.

Surrounding the entire active laser bundle matrix is an outer phosphor grain coat 93 and its adjacent, reflective, metallic coating 94. In FIG. 12, a plurality of radially-located, equally circumferentially spaced cathodes such as 96 and 98 provided an electron beam source to bring about the fluorescent light production from the phosphor grain coat 93. This light produced by the outer phosphor grain coat 93 also assists in raising the energy level of the active lasing material located in the active laser bundles.

This arrangement allows a number of different modes of operation. One form of this operation occurs when the central cathode 84 and all of the circumferentially located cathodes such as 96 and 98 are driven continuously, in the presence of a continuously pumped light source from a cathode ray tube 99.

An alternative operation would provide a mechanism to rotate the central cathode 84 and thereby direct the electron bombardment from the central cathode 84 in a continuous rotating pattern about the inside surface of the phosphor pump comprised of the reflective, metallic layer 86 and its adjacent phosphor grain coat 87. In conjunction with the rotary motion, the circumferentially located cathodes would be fired one at a time to produce an electron bombardment of the outer phosphor pump comprised of reflective, metallic layer 94 and its adjacent phosphor grain coat 93. The rotation of central cathode 84 and the sequential firing of the outer cathodes such as 96 and 98 would be locked in phase and accordingly, produce in the active fiber bundles a stimulated emission. The energy level needed for a stimulated emission would further be enhanced by the sweeping of an electron beam 100 in a phase locked condition with the rotating central cathode 84 and outer cathodes such as 96, 98. This would produce as an end result a continuous stimulated emission from the active fiber maser matrix which stimulated emission would be conducted throughout the active fiber bundles in a waveguide manner.

There exists another form of operation in which the central cathode 84 and outer cathodes such as 96 and 98 in conjunction with the cathode ray tube 99 are pulsed to produce a stimulated emission in the active maser bundles which accordingly, will produce a pulsed coherent light source.

Figure 14:
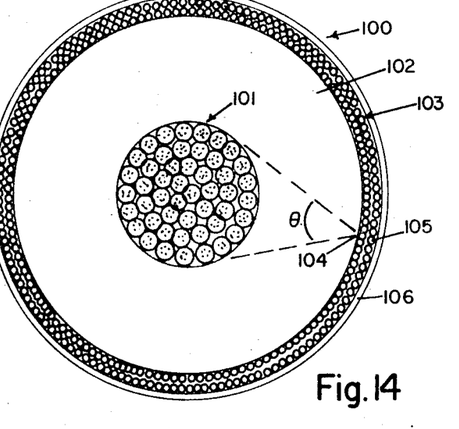
FIG. 14 depicts another embodiment allowing side light pumping of a group of active fiber bundles, FIG. 15 schematically illustrates another embodiment featuring central light pumping, FIG. 16 schematically depicts a matrix of active fiber optic bundles, FIG. 17 schematically shows a matrix comprised of a plurality of units of the type illustrated in FIG. 16.

Referring now to FIG. 14 which schematically shows the end portion of long cylinder 100 containing a central core 101 of active fiber maser bundles with the claddings (not shown) of the bundles fused so that there are no voids present. A high index of refraction material 102 which is dielectric surrounds the central core 101. A phosphor light pump in turn surrounds the high index of refraction material 102. The light pump is comprised of a phosphor grain coat 103 and is made up of many small grains such as 104. A thin, reflective, metallic layer 106 in turn surrounds the entire assembly.

This arrangement provides one of the most favored optical coupling set-ups possible, for here it is seen that the illumination source 103, 106 is in contact with the outer surface of high index of refraction material 102. The active fiber laser elements are formed into a cylindrical configuration in order that the tube so formed be mode supporting. All the energy leaving any grain 104 of the phosphor in the hemisphere toward the high index of refraction material 102 will be captured by the dielectric 102 and confined to a cone which has an apex angle $\theta$ defined by the relative index of refraction between the dielectric and its surroundings, i.e., $\theta = \text{arc sin } 1/n$.

For a long cylinder 100, the light directly entering dielectric from the phosphor coating will be intensified (i.e., voltage gain, not power gain) in the central core 101. The light leaving a grain 105 of phosphor in the hemisphere away from the dielectric 102 will be reflected from the reflective, metallic layer 106 over the phosphor grain coat 103, back through the grain, which is transparent to its own output, and into the dielectric as before or it will be partially reflected off neighboring grains and will be scattered by multiple reflection eventually entering the dielectric over a broader region. It is therefore seen that all of the light which is not absorbed in the process of reflection will eventually enter the dielectric 102 and arrive in the region of the central core 101.

The light that enters the central core 101 raises the energy levels in the active laser material thereby assisting the promotion of a stimulated emission.

The central core 101, may also comprise a single element such as a crystal or a rod of suitable laser glass. It may be clad with a solid dielectric or alternatively may be mounted in a thin glass or solid dielectric tube which is surrounded by a high index liquid which cools the matter element and the phosphor which is separated from the liquid by a suitable thin glass or other dielectric tube. Coolant may be run through the interstices of a fiber bundle in place of 101 or a solid rod in place of 101 may have one or more perforations to allow cooling liquid to flow. If perforations are placed in the rod or crystal they may be coated with a metallic reflective film on the surface between the liquid and the rod. The purpose of a film, if present, is to reflect pumping light back through the rod and also to improve thermal contact between coolant and the maser material. In some circumstances substances may be added to the coolant flowing between the phosphor and the maser substance to provide absorption of certain undesired wavelength emission from the pumping phosphor region.

In order to more fully understand this facet of the invention, it is helpful to visualize the central core 101 of high radiant density as being composed of a bundle of clad fibers so that the cross section has no voids, merely the differences in index of refraction between core and cladding. The incident light will all pass through the bundle and be absorbed or will come out the other side of the central core 101, be scattered and will re-enter the core from a different direction at reduced intensity.

The capture cross section of the maser glass fiber cores can be increased by having a region of varying index in the cladding near the core so that light passing near the core will be curved toward the core and thereby captured or at least, passed through the maser glass so as to be able to be absorbed.

By proper selection of relative diffusivity of glasses and by varying the ingredients in core and cladding, the above can be accomplished with a relatively small number of increased modes permitted for the core and a usefully great enhancement of capture cross section.

Figures 15, 16, 17:
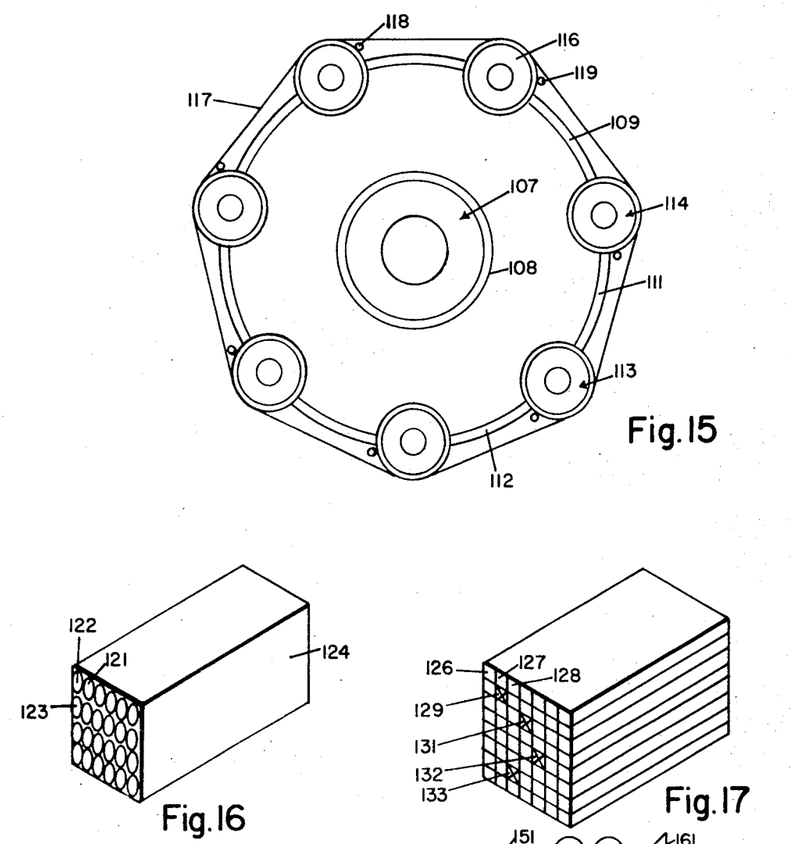

Referring now to FIG. 15 which incorporates clad active fiber bundles enclosed in a phosphor light pump of the type illustrated in FIG. 14.

FIG. 15 depicts an end view of a plurality of elongated, phosphor coated, clad fiber bundles such as 113, 114 and 116 circumferentially mounted on dielectric spacers such as 109, 111, 112. A hollow tube heater 107 is centrally disposed and has a cathode emissive coating 108. A mechanical securing strap 117 aids holding the phosphor coated clad fiber bundles 113, 114, 116 in place.

The dielectric spacers 109, 111, 112 have been schematically shown as arcuate bars but the dielectric spacer could just as well be made up of a notched disc. If notched discs are used, then the notched discs would be arranged along the cathode 107, 108 and the metal covered phosphor coated clad fiber bundles, possible 250–350 $\mu$ in diameter would be secured lengthwise in the notches in the spacers.

A suitable high strength dielectric is needed. Ruby mica or an etchable glass that can withstand up to 200,000 volts per millimeter would be adequate. Special precautions to insure a clean surface on such dielectric spacers would be required to prevent arcing due to low resistance paths caused by such impurities.

A group of six phosphor coated, clad fiber bundles or seven as shown in FIG. 15 are arranged on 2 millimeter diameter spacers. This arrangement would allow adequate frontal illumination of the phosphor by a cathode. The set-up depicted in FIG. 15 would be vacuum sealed.

In operation, it should be noted that the buildup of space charge because of excessive resistance in the thin, metallic layer of the phosphor clad bundle is alleviated by tapping supplementary conductors such as 118, 119 onto the metallic layer at intervals.

Referring now to FIG. 16 in which a large number of the tube units of the type illustrated in FIG. 15 are schematically shown mounted in a container 124 whose sides would be blackened and cooled to facilitate heat removal. Additional heat removing tubes may be inserted to shorten the mean free path for radiant heat removal.

Referring now to FIG. 17 which schematically illustrates a large system built up of units, such as 126, 127, 128 of the type shown fabricated in FIG. 16.

Certain units 129, 131, 132, 133 in the system are marked with Xs. These units 129, 131, 132, 133 are to be sampling units, the operation of which will be described more fully hereafter.

Figure 18:
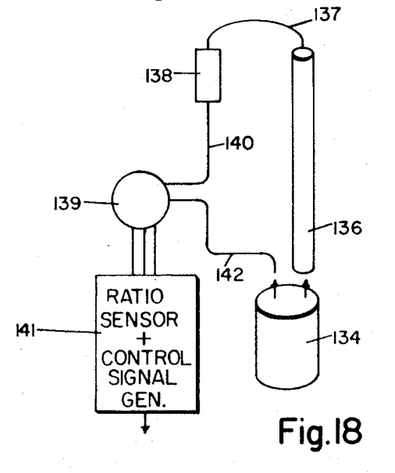
FIG. 18 illustrates a method of inversion sampling apparatus.

Referring now to FIG. 18 which schematically illustrates a technique and apparatus for determining the amount of inversion or the distribution of electrons in the energy states of an active lasing element.

A continuous wave light source 134 supplies a given amount of light of a particular band width. A portion of the light enters an active fiber assembly 136 where it experiences an intensity gain before emerging from its upper end and entering a simple glass optical fiber 137 which transports the light with its newly-acquired characteristic to an attenuator 138 placed in the line to avoid possible damage to subsequent components if the above noted characteristic is too high. A glass optical fiber 140 conducts the attenuated light to a photo diode 139 whose sensitive surface is divided into two regions. One region is illuminated by the output light from the active laser fiber assembly 136, and another region is illuminated by light from one-half of the continuous wave light source 134 via optical fiber 142. The currents produced by the respective maser output illumination verses the light source input illumination giving an indication of the amount of energy inversion in the active fiber assembly 136. This level is important to know because it determines the instant at which sufficient energy inversion has occurred to permit optimum operation of the device when used as an amplifier and also provides useful information when operating as a traveling wave oscillator.

Inversion sampling units of this type may be randomly located throughout an entire system of the type depicted in FIG. 17 to allow the operator of the system to know at any one instant the state of inversion for the system.

The inversion sampler depicted in FIG. 18 permits what may be termed "spot checks" of the system.

Figure 19:
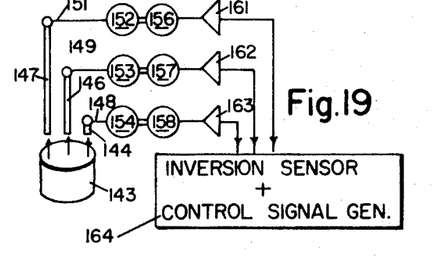
FIG. 19 illustrates another method of inversion sampling.

Referring now to FIG. 19, there is schematically illustrated another form of inversion sampler which will permit the operator of FIG. 17 system to determine the rate at which the inversion is taking place in the system.

This is accomplished by the selection of a plurality of different length bundles of active fiber elements, 144, 146, 147 in which an input light source 143 (at the pumping wave length) is used to determine the degree of inversion in the different length active fiber bundles 144, 146, 147. The amount of inversion present per unit length being indicative of the rate at which inversion is taking place in the active fiber bundles. This may best be understood by reference to FIG. 19 wherein there is depicted a continuous wave light source 143 which sends light to a plurality of schematically illustrated fiber bundles of different lengths 144, 146 and 147.

Starting with bundle 144, as the inversion takes place in 144, there is produced a weak signal at the upper end of the fiber bundle which is transported through a glass fiber 148 to an integrating sphere 154 which is placed in the light stream as a means of energizing the output of several similar fibers and also to avoid false photomultiplier output due to "hot spots" on the photomultiplier 158 photosensitive surface. The photomultipliers 158, 157, 156 are closely matched in performance. A protection function is also provided by the spheres should stimulated emission occur in the short fibers of bundles 144, 146, 147. The signals produced from an active fiber bundle such as 144 are very weak and accordingly, are amplified by an amplifier 163 before being fed into an inversion sensor and control signal generator 164.

Turning now to active fiber bundle 146 which has been purposely selected of a length which bears a direct relationship to active fiber bundle 144, for example, twice as long as the active fiber bundle 146. The amount of light from 143 emerging from the end of 144 is a function of the absorption of the fiber 146 which is directly proportioned to the state of inversion at any moment. The amount of absorption bears a direct relationship to the length of the fiber bundle and accordingly, a signal in the form of light coming from the end of fiber bundle 146 and transported via a glass fiber 149 to an integrating sphere 143 and a subsequent photomultiplier 157 and related amplifier 162 produces a signal which is indicative of the rate of inversion compared to the amount of inversion that has already taken place in active fiber bundle 144. For example, at time zero when no inversion has taken place, the photomultipliers 158, 157, 156 will have outputs related by the relationship $1_x=1_o$ where $x$ is the length of absorptive element and 2 is the absorption coefficient of which it is desired to know the value and the time rate of change of value. It should be noted that very fast delivery of pumping energy into the masing elements, by comparison to the normal spontaneous lifetime for emission makes the determination of the rate of change less significant as well as more difficult. Pumping rates slow enough so that the delivery of an amount of energy to cause stimulated emission (for a particular material) requires a period of time approaching that of the lifetime for spontaneous emission makes the measurement easier and of more significance.

With the initial conditions established the time at which the output from fiber 146 is equal to the output from fiber 144 at time zero allows the initial inversion rate to be established and comparison in a similar fashion of the output from 147 to 143 and so on allows refinement and smoothing of the information. The position of length $x$ and absorption coefficient 2 in the exponential position makes the retention of length differences and length ratios of importance. Ratios of $1/e$ and of small length differences as well as of value in construction of the practical device.

Obviously, many other modifications and variations of the invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

What is claimed is:

1. A fiber optic lasing system comprising an active fiber optic element,
    said active fiber optic element having a core and a cladding around said core,
    said core having therein an active material which will produce stimulated emission when an excitation source pumps energy into said active material,
    an excitation source,
    said excitation source located at one end of said active fiber element to pump energy into said active fiber optic element to produce a stimulated emission of said active material, said excitation source being in physical contact with said end of said fiber optic element.

2. A fiber optic lasing system comprising an active fiber optic element, said active fiber optic element having a core and a cladding around said core, said core having therein an active material which will produce stimulated emission when an excitation source pumps energy into said active material, an excitation source, said excitation source being in contact with an end of said fiber optic element to pump substantially all of its energy into said active fiber optic element to produce a stimulated emission of said active material, said cladding and said core of said active fiber optic element acting as a waveguide for translation of said stimulated emission.

3. A fiber optic lasing system comprising an active fiber optic element, said active fiber optic element having a core and a cladding around said core, said core having therein an active material which will produce stimulated emission when an excitation source pumps energy into said active material, said active material having a preferred excitation absorption band, an excitation source, said excitation source being in contact with an end of said fiber optic element to pump energy at a level of said preferred excitation absorption band into said active fiber optic element to produce a stimulated emission of said active material.

4. The fiber optic lasing system of claim 3 wherein said cladding and said core of said active fiber optic element forms a waveguide for translation of said stimulated emission.

5. A fiber optic lasing system comprising an active fiber optic element, said active fiber optic element having a core and a cladding around said core, said core having therein an active material which will produce stimulated emission when an excitation source pumps energy into said active material, said active material having a predetermined primary absorption band, an excitation source, said excitation source being in contact with an end of said fiber optic element to pump substantially all of its energy at said primary absorption band into an end of said active fiber optic element to produce a stimulated emission of said active material.

6. The fiber optic lasing system of claim 5 wherein said cladding and said core of said active fiber optic element forms a waveguide for translation of said stimulated emission.

7. A fiber optic lasing system comprising a plurality of fiber optic elements, said active fiber optic elements each having a core and a cladding around said core, each of said cores having therein an active material which will produce stimulated emission when an excitation source pumps energy into said active material, said active fiber optic elements being arranged in a bundle with said fiber optic element's cladding intimate contact to permit cross coupling between said fiber optic elements and thereby establish phase coherence between adjacent fiber optic elements, an excitation source, said excitation source being in contact with said fiber optic elements ends to pump energy into said active fiber optic elements to produce a stimulated emission of said active material.

8. A fiber optic lasing system comprising a plurality of fiber optic elements, said active fiber optic elements each having a core and a cladding around said core, each of said cores having therein an active material which will produce stimulated emission when an excitation source pumps energy into said active material, said active material having a predetermined excitation absorption band, said active fiber optic elements being arranged in a bundle with said fiber optic elements cladding in intimate contact, to permit cross coupling between said fiber optic elements and thereby establish phase coherence between said fiber optic elements in said bundle during a stimulated emission, said excitation source being in contact with said fiber optic elements ends to pump energy at said predetermined excitation absorption band into the end of said active fiber optic bundle to produce a stimulated emission of said active material, said cladding and said core of said active fiber optic elements acting as waveguides for translation of said stimulated emission.

9. A fiber optic lasing system comprising an active fiber optic element, said active fiber optic element having a core and a cladding around said core, said fiber optic element having a predetermined maximum angle of capture, a light source, said light source having a structure made up of a thin layer of phosphor grains and a thin film of highly reflective metal superimposed thereon, said light source having a portion positioned within said angle of capture whereby all of said light produced in said portion enters said fiber optic element, a source of electron energy, said source of electron energy directed at said layer of phosphor grains through said thin film of reflective metal to thereby produce a fluorescent light in said phosphor grains, said fluorescent light entering said fiber optic element and thereby producing a stimulated emission in said active fiber optic element.

10. A fiber optic lasing system comprising an active fiber optic element, said active fiber optic element having a core and a cladding around said core, said fiber optic element having a predetermined maximum angle of capture said core having therein an active material which will produce stimulated emission when an light energy source pumps light energy into said active material, a light energy source, said light energy source having a structure made up of a thin layer of phosphor grains and a thin film of highly reflective metal superimposed thereon, said light source having a portion positioned within said angle of capture whereby all of said light produced in said portion enters said fiber optic element, a source of electron energy, said source of electron energy directed at said layer of phosphor grains through said thin film of reflective metal to thereby produce a fluorescent light in said phosphor grains, said fluorescent light within said angle of capture entering said fiber optic element to thereby produce a stimulated emission of said active material.

11. The fiber optic lasing system in claim 10 wherein said cladding and said core of said active fiber optic element acts as a waveguide for translation of said stimulated emission.

12. The fiber optic lasing system of claim 10 wherein there is provided a means to cool said light source.

13. The fiber optic lasing system of claim 10 wherein there is provided a means to cool said active fiber optic element.

14. The fiber optic lasing system of claim 10 wherein said light energy source is arranged to pump said light energy into an end of said active fiber optic element.

* * * * *